Oct. 22, 1935.   C. L. PFEIFFER   2,018,379
APPARATUS FOR ELECTRIC WELDING
Original Filed March 16, 1928
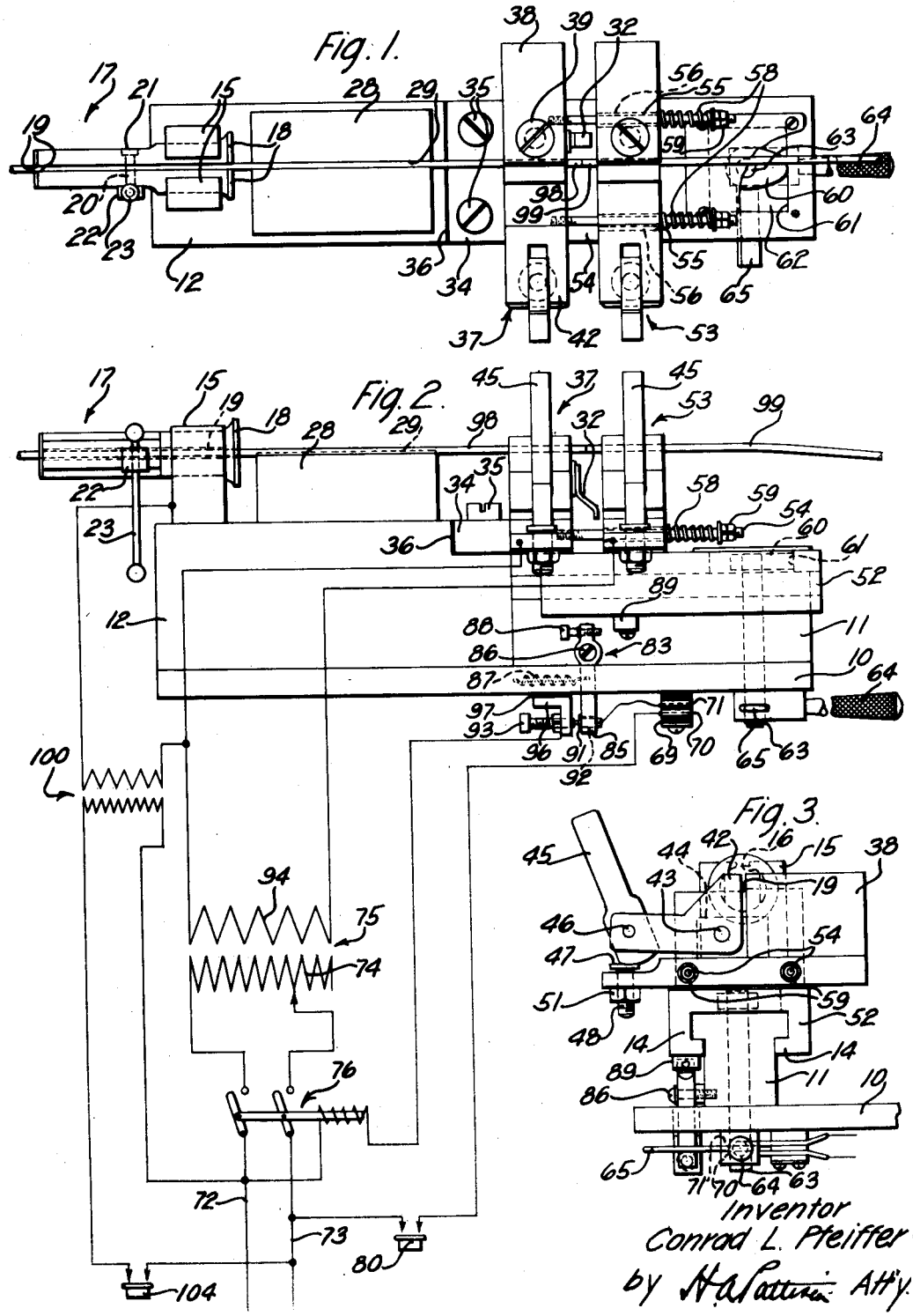
Inventor
Conrad L. Pfeiffer
by H. A. Patterson Att'y.

Patented Oct. 22, 1935

2,018,379

UNITED STATES PATENT OFFICE 2,018,379

APPARATUS FOR ELECTRIC WELDING

Conrad Louis Pfeiffer, Chicago, Ill., assignor to Western Electric Company, Incorporated, New York, N. Y., a corporation of New York Original application March 16, 1928, Serial No. 262,228. Divided and this application February 28, 1929, Serial No. 343,264. Renewed May 1, 1935

10 Claims. (Cl. 219—4)

This invention relates to an apparatus for electric welding, and more particularly to an apparatus for butt welding wire or rod material, and is a division of my copending application, Serial No. 262,228, filed March 16, 1928.

Heretofore in the art of electric butt welding many unsuccessful attempts have been made to weld non-ferrous materials, such as aluminum or copper in air, in such a manner that a strong ductile joint would be had which would be subsequently drawn through a succession of reducing dies without breaking at the point of welding. The welding art discloses many devices involving the use of pressure and mechanisms for working the metal in a plastic state at the point of fusion with a view to obtaining a weld of non-brittle structure. In practice these methods have been found to be unsatisfactory in some respects; especially is this true in the wire drawing art where the weld must have sufficient strength to withstand severe reductions.

In accordance with the fundamental principles underlying this invention, success has replaced failure due to the proper coordination of time, working pressure and high current densities heretofore unknown to those engaged in the art of electrical welding.

The primary object of this invention is to provide an electric welding apparatus of simple construction whereby a strong, ductile, homogeneous and autogenous weld between metallic bodies can be obtained.

In accordance with the general features of the invention, one embodiment thereof comprises a stationary clamp and a movable clamp for holding the material to be welded in abutting relation, the movable clamp being impelled along a guideway toward the stationary clamp through the action of helical springs compressed by a cam lever which also operates electrical contacts in the welding circuit to prevent premature closure thereof. A switch mechanism is also adapted for opening the welding circuit upon the movement of the clamp a predetermined distance after the weld has been completed and an auxiliary circuit is provided for subsequently annealing the welded portion.

The features and advantages of the invention will be better understood from the following description taken in connection with the accompanying drawing, in which Fig. 1 is a fragmentary plan view of a welding and annealing apparatus disclosing a representative embodiment of the invention;

Fig. 2 is a side elevation thereof showing the work in position before the welding operation commences and giving a diagrammatic view of the electrical connections, and Fig. 3 is an end view of the apparatus.

Referring now to the drawing in detail in which like reference numerals designate similar parts, a horizontal bed plate 10 is provided with a T-shaped guideway 11 and an elevated portion 12. Secured rigidly to the top of this elevated portion is the annealing apparatus including a bifurcated holder 15 having a circular opening 16 in which a vise 17 is rotatably supported. The vise consists of a pair of semi-circular members 18—18 having complemental V-notches 19—19 centrally located and extending longitudinally thereof for holding the welded material; a threaded bolt 20 protruding through apertures in the members 18 engages a nut 21 and has a head 22 in which a clamping handle 23 is slidably mounted. Sufficient clearance is provided between members 18—18 and the holder 15 to permit the members 18—18 to be manually rotated, and also to permit them to be separated from each other by rotation of the handle 23 to insert and remove the wire or rod, but an electrical connection between members 18—18 and the holder 15 is maintained by reason of the tendency of the outer end of the vise to fall due to gravity, which tendency is resisted by the holder 15 contacting with the vise at its outer and inner edges. This vise is used in the annealing and filing operations which will be readily understood from the description as it progresses. Positioned directly in front of the vise 17 is a filing block 28 which is fastened to the elevated portion 12 of the bed plate 10. The top surface of the filing block is provided with two flat portions, one higher than the other, to form a wire supporting ledge 29 which is so positioned as to be in direct alignment with the V-notches 19 in the longitudinal faces of the semi-circular clamping members 18.

The stationary part of the welding device includes a plate 34 attached to the elevated portion 12 by screws 35—35 and insulated therefrom by an insulating strip 36. The plate 34 in turn supports a wire or rod clamping device 37 which comprises a fixed copper jaw 38 secured to the plate 34 by a screw 39 and a movable jaw 42 pivoted at 43 to a lug 44 integral with the plate 34, the movable jaw having a slotted lever arm with a handle 45 pivoted within the slot by means of a pin 46. The handle has a cam surface 47 which engages the top of an adjustable stud 48 threaded into the forward end of the plate 34 whereby on raising the handle 45 a clamping action may be exerted between the jaws 38 and 42. In order to adjust the clamping action to suit various wire diameters the stud 48 is rotated to a lower or higher elevation and locked in position by a nut 51, thereby regulating the clamping movement of the movable jaw by controlling the degree of engagement of the cam surface 47 of the handle with the top of the stud 48.

The T-shaped guideway 11 of the bed plate 10 has fitted to it a slide 52, the side edges of which consist of flanges 14 slidably embracing the guideway, as shown in Fig. 3, to allow the slide to have a reciprocating movement in a rectilinear path. A clamping device 53, the counterpart of the clamping device 37, is rigidly mounted on the slide 52. Rods 54 are threaded into the plate 34 supporting the stationary clamping device 37 and pass through and extend beyond apertures 55 in an upper projection of the slide 52 supporting the clamp 53. The rods are insulated from the slide 52 by insulating tubes 56 and the object of the rods is to provide means for impelling the movable clamping device 53 toward the stationary clamping device 37. This action is accomplished through compression springs 58 interposed between the side of the upper projection of the slide 52 and flanged nuts 59 threaded on the ends of the rods 54. The compression springs are designed to impart a pressure varying from zero to two hundred (200) pounds in welding copper wire from the smallest size up to ¼" in diameter. The movable clamp 53 is retracted and the springs compressed through the action of a cam 60 engaging the edge 61 of a square opening 62 in the slide 52. The cam in turn is actuated by means of a shaft 63 rotatably supported in the guideway 11 and fastened to a lever 64 which carries a knife switch 65. An insulator block 69 carrying two independent contacts 70—71 is fastened to the underside of the bed plate 10 in such a position that when the hand lever 64 is rotated clockwise through 90° (Fig. 1) to release the slide 52 the knife switch 65 will electrically interconnect the contacts 70 and 71 to partially complete the welding circuit which will be described.

The electrical connections for supplying current to the welding and annealing apparatus are illustrated diagrammatically in Fig. 2, wherein the electrical supply mains 72—73 are connected to a source of alternating current (not shown). A welding transformer 75 having an adjustable primary is so designed that the secondary 94 thereof will deliver a high amperage of the desired amount; for instance, in the welding of copper wire from No. 24 (B and S) gauge to No. 2 gauge the secondary of the transformer must be capable of delivering a current of from 200 to 20,000 amperes. The control circuit of the welding transformer 75 includes an electro-magnetically operated switch 76, a push button switch 80, the knife switch 65 and an automatic interrupter 83. The interrupter 83 includes a lever 85 pivoted by means of a bolt 86 to the guideway 11 and normally held in retracted position by a tension spring 87. The upper part of the lever 85 carries an adjustable threaded bolt 88 adapted to be engaged and rotated by a trip block 89 fastened to the underside of the slide 52. A contact pin 91, which is securely fastened to the lower part of the lever 85 and insulated therefrom by insulator 92 is adapted to make an electrical connection with an adjustable screw 93 threaded into an angular steel member 96 which is securely fastened to the underside of the bed 10 and insulated therefrom by an insulating strip 97. The secondary 94 of the welding transformer 75 is connected to the copper jaws of the clamping devices 37 and 53 which serve as electrodes for conducting electric current to wires 98—99 to be welded. A transformer 100 is provided for supplying current at the desired voltage for annealing the wire after it is welded. The primary of this annealing transformer is connected through push button switch 104 to the feed mains 72—73; the terminals of the secondary are connected to the vise helder 15 and the stationary clamping device 37, respectively.

In operating the apparatus disclosed, the lever 64 is rotated counter-clockwise through 90° to the position shown in Fig. 1 of the drawing whereby the cam 60 engaging the edge of the opening 62 in slide 52 forces the latter away from the stationary clamping device 37 and compresses the springs 58. The wires or rods 98 and 99 to be welded are placed in the clamping devices in abutting relationship so as to give equal projections to each wire between the clamps and the clamp handles 45 are pushed upwardly to effect the clamping action and hold the wires in proper position. The compression of the springs 58 has been previously adjusted by turning the nuts 59 on the rods 54 until the desired pressure was obtained between the wires 98 and 99. Also, the number of effective turns of the primary 74 of the welding transformer has been adjusted until the induced current of the secondary 94 thereof has reached a predetermined density. The pressure and current density need only be adjusted once in welding a particular size and kind of wire. In order to obtain the proper timing, that is, the time during which electric current will flow through the wires being welded, the threaded bolt 88 of the circuit breaker or interrupter 83 is adjusted to engage the trip block 89 upon the movement of the slide 52 through a predetermined distance.

With the foregoing adjustments duly made, the lever 64 is thrown 90° clockwise releasing the slide 52 and causing the knife blade 65 to connect the terminals 70 and 71 previously described. The operator then operates the push button 80 which causes the electro-magnetic switch 76 to actuate and close the circuit to the primary of the transformer. This connection of the primary with the alternating current supply mains 72—73 results in a flow of electric current in the secondary of the transformer and thence through the wires 98—99. The heavy copper conductors from the secondary of the transformer are of sufficient cross-sectional area that very little resistance is encountered by the electric current in passing to the wires to be welded. However, upon the current reaching the wires between the clamping electrodes the reduction in cross-sectional area greatly increases the current density, thereby increasing the heat per unit of volume. As the heat of the metal increases the resistance also increases, and the welding is accelerated. When the ends of the wires become plastic they are pressed into each other under the impelling force of the compression springs 58—58 and are fused together; the metal then spreads, extruding the surfaces into an annular ridge or tough fin at the junction point. The resistance and resulting heat are comparatively great due to the high current density and the weld is accomplished in a short interval of time. By the term "a short interval of time" as used herein is meant a period of .02 to 1 second.

Upon the movement of the clamping electrode 53 through a predetermined distance the trip 89 engages the lever 85 and breaks the control circuit which de-energizes the electromagnetic switch to open the primary 74 of the welding transformer 75, thereby discontinuing the welding current.

The welded wires are removed from the clamping devices 37 and 53 and the wires reclamped in the clamp 37 and the vise 17 so that the welded joint is supported on the filing block 26. The operator then grasps the vise 17 in his left hand and slowly rotates it, meanwhile removing the annular ridge from the weld by means of a file in his right hand. The twisting in the filing is taken up by the wire a distance of about ¼" on each side of the welded joint and serves to harden that portion of the wire. After the filing, a length of about three inches with the weld at the center is annealed at a dull red heat by compressing the push button 104 to close the annealing circuit and transmit an annealing current through the secondary winding of the annealing transformer 100, holder 15, vise 17, the welded portion of the united wires 98—99, and clamp 37.

In the welding of copper wire or rod a current density of .3 to 1 ampere per circular mil is used along with a compression of substantially 4,200 pounds per square inch of cross-sectional area of the wires being welded.

The welding of aluminum is much more difficult and heretofore has not been successfully attained in butt welding. The use of the apparatus disclosed therein produces a tough aluminum weld of sufficient strength to withstand a plurality of severe reductions in successive wire drawing operations. In the welding of aluminum, a spring 32 is interposed in any suitable manner between the clamping devices such as insulating it from and fastening it to the stationary jaw 38 of the fixed clamping device 37. This spring is adjusted so that when the welding circuit is opened by the trip 89 the compressing force between the clamping devices will have been gradually reduced to zero from the time that the fused aluminum starts to harden. Hence, a full amount of pressure is not exerted throughout the entire heating and welding operation as this pressure will usually result in an inferior weld. The use of a high current density of 0.1 to 0.6 ampere per circular mil with an initial pressure of approximately 600 pounds per square inch of the cross-sectional area of the aluminum to be welded produces a tough weld in an interval of time from .02 to 1 second depending on the size of the aluminum stock. It has been found that a better weld can be obtained by abutting the ends of the material to be welded so that they are in contact with each other at all points with no air space therebetween. Fused aluminum combines very readily with oxygen and has little strength in the plastic state so that the novel use of high current density and a pressure that tapers off to zero permits of a weld being made in a very short period of time reducing the opportunities of oxidization, and preventing pressure being applied while the metal is hardening which application of pressure at the wrong moment disrupts the sensitive crystalline structure and may result in a brittle weld.

It will thus be apparent that this invention discloses a material advancement in the art of butt welding and while the invention is described and illustrated by a specific embodiment it will be understood that this is merely a convenient and useful form of the invention which is capable of many other modifications without departing from the spirit and scope of the invention disclosed and as defined by the appended claims.

What is claimed is:

1. In an electric welding apparatus, a welding circuit including the materials to be welded, means for compressing the materials to be welded, means for applying a welding current for a predetermined period of time, and means for gradually reducing the compressing force to zero as the materials are fused together.

2. In an electric welding apparatus, a welding circuit including the materials to be welded, two relatively movable clamping means, means for exerting pressure between the two clamping means, an element for effecting relative movement between the clamping means against the pressure means, means controlled by the operation of said element for closing the welding circuit when the element is in a predetermined position, and means for gradually reducing the pressure between the two clamping means as the distance therebetween decreases.

3. In an electric welding apparatus, a welding circuit including the parts to be welded, two clamping members for the parts to be welded one being movable toward and away from the other, resilient means for urging the movable clamping member toward the other clamping member, and a single control member for rendering the resilient means operative and inoperative and for simultaneously closing and opening the welding circuit.

4. In an electric welding apparatus, a clamping member, a second clamping member movable toward and away from the first mentioned clamping member, a welding circuit including said clamping members and the part to be welded, pressure means for urging said second clamping member toward the first mentioned clamping member, control means for rendering the pressure means operative and inoperative, and means responsive to the operation of the control means for closing the welding circuit when the pressure means is rendered operative and for opening the welding circuit when the pressure means is rendered inoperative.

5. In an electric welding apparatus, a stationary clamping member, a slide reciprocable toward and away from the stationary clamping member, a second clamping member mounted on the slide, means for impelling the slide toward the stationary clamping member, a welding circuit including the clamping members, a cam adapted to engage the slide to retract it against the impelling means, and means controlled by the movement of the cam for closing the welding circuit.

6. In an electric welding apparatus, relatively movable clamping members for holding parts to be welded in abutting relationship, means for moving one of the clamping members with respect to the other to compress the parts, means for applying a welding current to the parts, and means for reducing the pressure between the parts during the application of the welding current to the parts.

7. In an electric welding apparatus, a welding circuit including the parts to be welded, relatively movable clamping members for the parts to be welded, a single control member for effecting a relative movement of the clamping members to compress the parts and for simultaneously closing the welding circuit, and means effective upon a predetermined relative movement of the clamping members for opening the welding circuit.

8. In an electric welding apparatus, a welding circuit including the parts to be welded, relatively movable clamping members for the parts to be welded, a movable control member, means responsive to a movement of said control member for effecting a relative movement of the clamping members to compress the parts, means also responsive to said movement of the control member for closing the welding circuit, and means for opening the welding circuit automatically upon a predetermined relative movement of the clamping members.

9. In an electric welding apparatus, a welding circuit including the parts to be welded, relatively movable clamping members for the parts to be welded, resilient means for causing a relative movement of the clamping members to compress the parts, a movable control member, means responsive to a movement of said control member for rendering the resilient means effective, and means also responsive to said movement of the control member for closing the welding circuit.

10. In an electric welding apparatus, a welding circuit including the parts to be welded, relatively movable clamping members for the parts to be welded, resilient means for causing a relative movement of the clamping members to compress the parts, a movable control member, means responsive to a movement of said control member for rendering the resilient means effective, and means rendered effective by the control member at a predetermined point of said movement for closing the welding circuit.

CONRAD LOUIS PFEIFFER.